(12) United States Patent
Brooker et al.

(10) Patent No.: US 8,175,952 B2
(45) Date of Patent: May 8, 2012

(54) SYSTEM AND METHOD FOR MANAGING A GROUP INSURANCE POLICY (75) Inventors: David E. Brooker, Washington, DC (US); Daniel Stringham, Randolph, NJ (US); Catherine A. Smith, Boonton, NJ (US); Craig S. Sharf, Caldwell, NJ (US); Kenneth M. Petro, Florham Park, NJ (US); Rocco A. Mariano, Jr., Dover, NJ (US); Rosanne J. Baruh, Highland Park, NJ (US); Carol Ann York, Cape May, NJ (US)

(73) Assignee: The Prudential Insurance Company of America, Newark, NJ (US)

( * ) Notice: Subject to any disclaimer, the term of this patent is extended or adjusted under 35 U.S.C. 154(b) by 249 days.

(21) Appl. No.: 12/718,119

(22) Filed: Mar. 5, 2010

(65) Prior Publication Data

US 2010/0228571 A1    Sep. 9, 2010

Related U.S. Application Data (60) Provisional application No. 61/157,832, filed on Mar. 5, 2009, provisional application No. 61/223,837, filed on Jul. 8, 2009.

(51) Int. Cl.
*G06Q 40/00* (2012.01)
(52) U.S. Cl. .............. 705/36 T; 705/4; 705/35
(58) Field of Classification Search .......... 705/36 T, 705/4, 35
See application file for complete search history.

(56) References Cited

U.S. PATENT DOCUMENTS

| | | | | |
|---|---|---|---|---|
| 4,837,693 | A | * | 6/1989 | Schotz ............................ 705/4 |
| 5,191,522 | A | * | 3/1993 | Bosco et al. ..................... 705/4 |
| 2010/0228572 | A1 | | 9/2010 | Brooker et al. |

OTHER PUBLICATIONS

Bob Marsh, & Brian H Kleiner. (2004). An Overview of Trends in Employee Benefits Programmes. Management Research News, 27(4/5), 2-8. Retrieved Dec. 24, 2011.*
Greenberg Traurig, LLP, "Split of One Life Insurance Policy into Two is not a Taxable Exchange or Sale," Special Report, pp. 1-3, Feb. 2007.
Schnurr, Rick, ASA, MAAA, "A Layman's Guide to Corporate-Owned Life Insurance," Published Jul. 2008, Society of Actuaries, 27 pages.
Group Universal Life Insurance Outline, (trrgllot.pdf), 50 pages, Sep. 9, 2002.
Brooker et al., "System and Method for Managing a Group Insurance Policy," U.S. Appl. No. 12/718,556, 43 pages, filed May 5, 2010.

* cited by examiner

*Primary Examiner* — Narayanswamy Subramanian
*Assistant Examiner* — Kito R Robinson
(74) *Attorney, Agent, or Firm* — Baker Botts L.L.P.

(57) ABSTRACT

According to one embodiment, a method for managing a group life insurance policy with a plurality of certificates is provided. The group life insurance policy is at least partially funded by a financial account comprising one or more payments paid by a sponsor. The one or more payments are expected to fund the group life insurance policy for a multi-year period. The group life insurance policy is configured to provide life insurance coverage for a plurality of persons pursuant to the plurality of certificates.

46 Claims, 4 Drawing Sheets

| YR. | ACCOUNT VALUE |
|---|---|
| 0 | $155,000,000 |
| 1 | $153,055,147 |
| 2 | $151,245,361 |
| 3 | $149,257,406 |
| 4 | $147,073,736 |
| 5 | $144,675,078 |
| 6 | $142,912,135 |
| 7 | $141,847,507 |
| 8 | $141,549,956 |
| 9 | $142,095,018 |
| 10 | $142,693,792 |
| 11 | $143,351,567 |
| 12 | $144,074,154 |
| 13 | $144,867,936 |
| 14 | $145,739,923 |
| 15 | $146,697,819 |
| 16 | $147,750,082 |
| 17 | $148,906,007 |
| 18 | $150,175,802 |
| 19 | $151,570,682 |
| 20 | $153,102,965 |

| NAME | FACE | AGE | COI | OCV | ALLOC % | ALLOC FACTOR |
|---|---|---|---|---|---|---|
| INSURED A | $50,000 | 25 | $222.00 | 1336.844 | 5.35% | 1512.32 |
| INSURED B | $93,500 | 30 | $628.80 | 2947.339 | 11.79% | 3334.21 |
| INSURED C | $130,000 | 35 | $1370.16 | 4390.604 | 17.56% | 4966.92 |
| INSURED D | $160,000 | 40 | $1900.80 | 6596.531 | 26.39% | 7462.40 |
| INSURED E | $150,000 | 50 | $4320.00 | 9728.682 | 38.91% | 11005.68 |

*FIG. 5A*

| NAME | STATUS | AGE | FACE AMOUNT |
|---|---|---|---|
| INS A | TERM | 25 | $50,000 |
| INS F | NEW | 27 | $52,500 |

*FIG. 5B*

| NAME | OCV |
|---|---|
| INSURED B | 2947 |
| INSURED C | 4390 |
| INSURED D | 6596 |
| INSURED E | 9728 |
| INSURED F | 1390 |

SYSTEM AND METHOD FOR MANAGING A GROUP INSURANCE POLICY

RELATED APPLICATION

This application claims priority to U.S. Provisional Application Ser. No. 61/157,832 filed Mar. 5, 2009 and U.S. Provisional Application Ser. No. 61/223,837 filed Jul. 8, 2009.

TECHNICAL FIELD

This disclosure relates in general to the field of financial systems, and more particularly to a system and method for managing a group insurance policy.

BACKGROUND

Insurance, in law and economics, is a form of risk management primarily used to hedge against the risk of a contingent loss. Insurance is sometimes defined as the equitable transfer of the risk of a loss, from one entity to another, in exchange for a premium. An insurer typically is a company selling the insurance; and an insured typically is the person or entity buying the insurance. The insurance rate is often a factor used to determine the amount, called the premium, to be charged for a certain amount of insurance coverage. Life insurance typically provides a monetary benefit to a designated beneficiary, which typically is payable upon the death of an insured person. Life insurance policies often allow the option of having the proceeds paid to the beneficiary either in a lump sum cash payment or an annuity. Group life policies are typically insurance policies offered to a group of people who share a qualifying characteristic or membership. Most often they are offered to employees, though they may also be offered through organizations or even commercial outlets, such as credit cards or magazines and newspapers.

SUMMARY OF THE INVENTION

According to one embodiment, a method for managing a group life insurance policy with a plurality of certificates is provided. The group life insurance policy is at least partially funded by a financial account comprising one or more payments paid by a sponsor. The one or more payments are expected to fund the group life insurance policy for a multi-year period. An optimum allocation value is calculated, which is indicative of a respective portion of financial account determined to be optimally allocated to the certificate. A deposit is created for each certificate by allocating a respective portion of the financial account to the certificate. The allocated portion may have a value based at least in part on the calculated optimum allocation value. In response to one or more inputs, the financial account is reallocated such that a new deposit is created for a new certificate using at least a portion of the financial account allocated to the plurality of certificates in creating the deposits for the plurality of certificates.

Certain embodiments may provide various technical advantages. In some embodiments, for example, one or more computer-implemented rules may be used to manage and optimize the exchange and funding of certificates of a group life insurance policy. In some embodiments, portions of a financial account may be reallocated among multiple certificates issued pursuant to a group life insurance policy. The reallocation may occur periodically and/or in response to particular events. Such reallocation may, for example, be configured to increase the likelihood that investments associated with a group life insurance policy may have tax-preferred investment growth. Particular embodiments may be capable of autonomously or semi-autonomously providing all, some, or none of these services.

Other technical advantages will be readily apparent to one skilled in the art from the following figures, descriptions, and claims. Moreover, while specific advantages have been enumerated above, various embodiments may include all, some, or none of the enumerated advantages.

DETAILED DESCRIPTION

The example embodiments of the present disclosure are best understood by referring to FIGS. 1A through 6 of the drawings, like numerals being used for like and corresponding parts of the various drawings. It should be understood at the outset that although example implementations of embodiments of the disclosure are described below, the present disclosure may be implemented using any number of techniques, whether currently known or not. The present disclosure should in no way be limited to the example implementations, drawings, and techniques illustrated below.

Figure 1A:
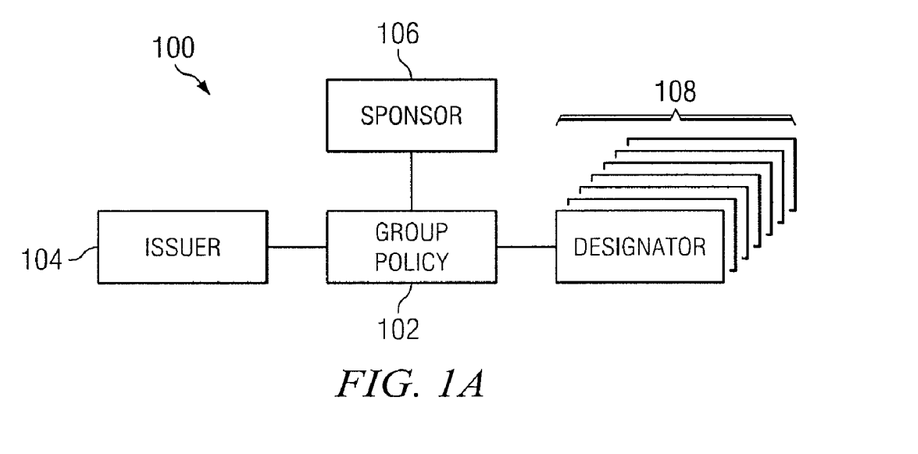
FIG. 1A illustrates a system for providing a group life insurance policy according to a particular embodiment.

FIG. 1A is a block diagram illustrating a portion of a system 100 for providing a group life insurance policy 102 according to a particular embodiment. In this example, the illustrated portion of system 100 generally includes an issuer 104 capable of providing any of a variety of group life insurance policies 102 to one or more sponsors 106. Group life insurance policies 102 generally provide a benefit for multiple beneficiaries, generally designated by one or more designators 108. Some group life insurance policies 102 may include certain provisions as described below with reference to FIG. 1B.

Group life insurance policy 102 may be a group life insurance policy for the employees of sponsor 106. More specifically, group life insurance policy 102 may be a sponsor-owned group life contract that may be substantially funded for a multi-year time period using an account established at the inception of group life insurance policy 102. Various embodiments may provide that the time period group life insurance policy 102 is initially intended to endure may be predetermined, subject to modifications, and/or extendable; however, some other group life insurance policies 102 may not contractually endure for a predetermined time period but instead may endure, for example, for so long as the group life insurance policy 102 is sufficiently funded by initial aggregate payment 158 and/or any other subsequent cash outlays paid by sponsor 106 to issuer 104. Group life insurance policy 102 may be structured to provide basic life insurance benefits for multiple designators 108, including future designators 108, who in some embodiments may have an ongoing or prior relationship with sponsor 106 (e.g., an employer-employee relationship, a partner relationship, etc.). In certain embodiments, group life insurance policy 102 may be a variable life insurance policy, a universal life insurance policy, and/or a flexible premium life insurance policy. Other forms of life insurance policies may be used without departing from the scope of the present invention. In various embodiments, the value and/or services provided by issuer 104 to sponsor 106 pursuant to group life insurance policy 102 may be at least partially implemented using logic embodied in computer-readable media.

Issuer 104 generally refers to any entity capable of offering and/or managing group life insurance policy 102. For example, issuer 104 may represent a bank, an insurance company, a partnership, some other business entity, a licensed individual, and/or a system engaged in the sale and/or management of one or more group life insurance policies 102. Issuer 104 may also represent multiple entities that operate together to provide, sell, and/or manage group life insurance policy 102. In a particular embodiment, issuer 104 may be wholly or partially owned by a parent company and may join in the filing of a consolidated federal income tax return with the parent company on a calendar year basis, using an accrual method of accounting. In some embodiments, issuer 104 may own at least a portion of one or more subsidiary companies capable of offering a group life insurance policy 102 to sponsor 106.

Sponsor 106 generally refers to any entity or entities capable of sponsoring or purchasing group life insurance policy 102. For example, sponsor 106 may be one or more persons, companies, partnerships, associations, any combination of the preceding, or any other entity capable of sponsoring or purchasing group life insurance policy 102. In a particular embodiment, sponsor 106 is an employer who provides consideration in exchange for a group life insurance policy 102 pursuant to which multiple designators 108 employed by sponsor 106 may each be entitled to designate a recipient of a benefit. In some embodiments, various conditions and/or events may affect whether the intended recipient is ultimately entitled to the benefit. For example, a designated recipient may be entitled to a death benefit pursuant to group life insurance policy 102 if a corresponding designator 108 dies while employed by sponsor 106, or within a time period set with reference to, a particular event satisfying certain conditions.

Each designator 108 generally refers to any entity entitled to designate at least one beneficiary as recipient of a benefit pursuant to group life insurance policy 102. In certain embodiments, designator 108 may represent an individual, group of individuals, an employee of an employer sponsor 106, an associate or partner of a partnership sponsor 106, a member of an association sponsor 106, any combination of the preceding, and/or some other entity that may be referred to for purposes of determining benefits, fees, guaranteed rates, expected liabilities, and/or other features of group life insurance policy 102, as described further with reference to FIG. 1B.

Figure 1B:
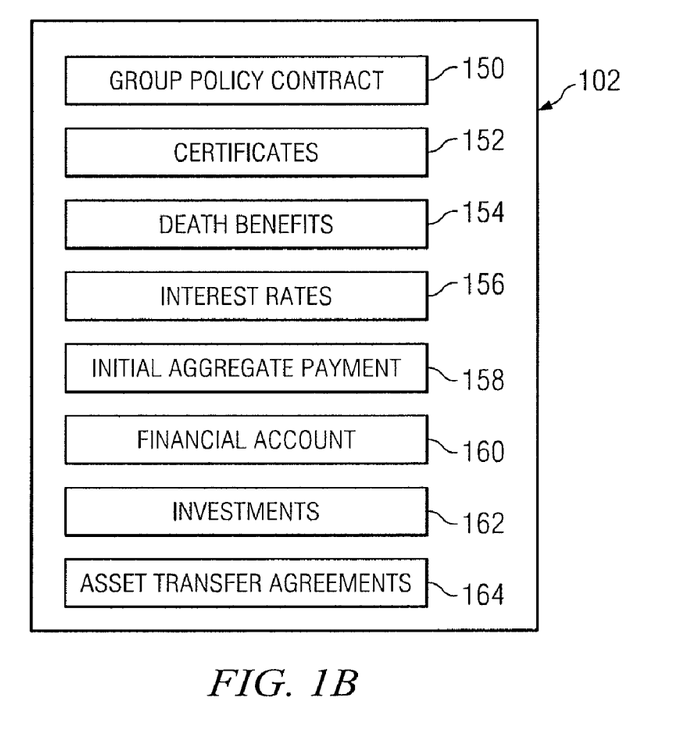
FIG. 1B illustrates a particular embodiment of a group life insurance policy.

FIG. 1B is a block diagram illustrating a portion of group life insurance policy 102 according to a particular embodiment. In the embodiment shown, group life insurance policy 102 generally includes provisions related to: a group policy contract 150, the issuance of certificates 152, death benefits 154, interest rates 156, an initial aggregate payment 158, a financial account 160, investments 162, and/or asset transfer agreements 164. Although various elements of group life insurance policy 102 are illustrated as separate elements, one or more of these elements may be combined, group life insurance policy 102 may include multiples of these elements, each of these elements may also include numerous subcomponents, and/or various embodiments may include provisions related to some, none, or all of the illustrated elements.

In a particular embodiment, group policy contract 150 is a variable group life contract structured to provide basic life insurance benefits for designators 108. In certain embodiments, group policy contract 150 may include provisions concerning the issuance of a plurality of certificates 152. In various embodiments, each certificate 152 issued pursuant to group policy contract 150 and/or group life insurance policy 102 may represent a variable contract and/or may be designed to qualify as a separate account life insurance contract for tax purposes. In addition, each certificate 152 may be related or assigned to a respective designator 108 and may represent a respective death benefit 154 and/or the beneficiary designation(s) of the respective designator 108.

In a particular embodiment, for example, each certificate 152 may insure the life of a covered designator 108 while the designator 108 remains employed by sponsor 106; and the covered designator 108 may have the right to designate one or more recipients of death benefit 154, which is payable under the certificate 152 upon the designator's 108 death. In some embodiments, the employer sponsor 106 may retain the remainder of rights with respect to each certificate 152, including, for example, the right to access the cash value of the certificate 152 at any time through a partial withdrawal, surrender, and/or exchange of the certificate 152. In that regard, group life insurance policy 102 may be structured such that, rather than continuing coverage after a covered designator 108 is no longer employed by sponsor 106, the sponsor 106 may seek to exchange the corresponding certificate 152 for a new certificate 152 insuring the life of a different designator 108 who is a current or prospective employee of sponsor 106. Thus, in some embodiments, coverage under certificates 152 may not extend beyond the normal retirement age of designator 108 employees (e.g., age 65) and in many cases may terminate sooner due to employee turnover. However, in some embodiments coverage under at least some of certificates 152 may continue into the retirement of respective designators 108.

The costs associated with some certificates 152 may vary depending, for example, on the age, gender, salary, job grade, lifestyle and/or health of the corresponding designator 108 and/or the value of the associated death benefit 154. In particular embodiments, at least some of these costs may be calculated using values retrieved from a digitally-stored lookup table. As explained further below, some certificates 152 may be represented, stored, modified, deleted, created, exchanged, and/or otherwise managed in accordance with logic embodied in computer-readable media. Thus, certificates 154 may exist in any suitable form, such as, for example, paper documents, a virtual form represented by data embodied in computer-readable media, and/or some other suitable form.

In a particular embodiment, each death benefit 154 may provide that payment(s) are to be made to one or more beneficiaries designated by a respective designator 108. In some embodiments, entitlement to the death benefit 154 payment(s) may be contingent upon certain conditions, such as, for example, the death of the respective designator 108; however, entitlement to death benefit 154 payment(s) may be contingent upon any of a variety of additional and/or alternative conditions and/or events. In some cases where sponsor 106 employs designators 108, for example, entitlement to payment(s) pursuant to a particular death benefit 154 may be contingent upon whether the corresponding designator 108 dies while employed by the employer sponsor 106. In another example, if the employer sponsor 106 continues death benefit 154 coverage after a particular designator 108 is no longer employed by sponsor 106, then the death benefit 154 may still be payable to a designated beneficiary upon the death of the particular designator 108 provided that the designator 108 has not changed the beneficiary.

In certain embodiments, death benefit 154 may provide that payment(s) be made in the amount of the highest value resulting from multiple calculation methods. For example, death benefit 154 may provide for payment of an amount substantially equal to the greater of (i) the "face amount" coverage under a corresponding certificate 152, and (ii) the amount obtained by dividing a cash value associated with the certificate 152 (referred to herein as the "certificate fund" allocable to the certificate 152) by a net single premium factor. In some embodiments, the face amount coverage of each certificate 152 may be at least partially determined, for example, with reference to the base salary of a respective designator 108 and/or with reference to one or more other values related to a respective designator 108. In various embodiments, a net single premium factor per $1 of a death benefit 154 may be determined, at least in part, in accordance with the one or more of the following: (i) on the basis of interest at the greater of an annual effective rate of 4% or in accordance with one or more interest rates 156 and/or interest rate 156 formulas that may be specified in group life insurance policy 102; (ii) using mortality charges based on factors that may include, for example, the age, gender, lifestyle, and/or health of a corresponding designator 108, and/or (iii) by taking into account a level of death benefit 154 per $1 that may be provided at least until a particular event occurs. Some example events may include the termination of a corresponding designator's 108 employment by sponsor 106, the attainment of the age 100 by the corresponding designator 108, and/or any other of a variety of events. In a particular embodiment, at least some of the mortality charges may be retrieved and/or derived at least partially from one or more digitally-stored lookup tables.

Although death benefit 154 is illustrated as a separate element of group life insurance policy 102, death benefit 154 may be formed from multiple components and/or may be included as part of another element of group life insurance policy 102. In some embodiments, for example, each death benefit 154 may be represented by, and/or payable under, a respective certificate 152 that may be issued pursuant to, and/or sometime after the formal execution of, group life insurance policy 102.

The terms interest and elements of interest as used herein generally refer to any gain that may accrue on an investment. For example, in the embodiment shown in FIG. 1B interest rates 156 generally refer to fixed and/or variable rates of return on financial account 160 and/or investments 162; however, elements of interest may be at least partially based on any of a variety of other factors. For example, various embodiments may include elements of interest that may be at least partially based on the market performance of investments 162, and/or one or more market indices.

In a particular embodiment, initial aggregate payment 158 represents one or more payments exchanged for group life insurance policy 102 that are collectively expected to substantially fund the costs associated with group life insurance policy 102 for a period of time that may last multiple months or years (e.g., a time period lasting six months, one year, fifteen months, two years, five years, ten years, twenty years, twenty-five years, thirty years, fifty years, some time period in between any one of these examples, or some other duration that may or may not be calculated in terms of months and years). Pursuant to some group life insurance policies 102, for example, sponsor 106 may pay initial aggregate payment 158 to issuer 104 as a single cash outlay at the inception of group life insurance policy 102; and issuer 104 may, for example, automatically and periodically deduct a respective portion of initial aggregate payment 158 and/or the interest accrued by initial aggregate payment 158 to satisfy costs and/or premiums associated with each certificate 152.

The value of initial aggregate payment 158 may be determined in any of a variety of ways. For example, initial aggregate payment 158 may have a value contractually agreed to by issuer 104 and sponsor 106. The agreed upon value may or may not depend on any of a variety of sponsor-based and/or issuer-based calculations. In particular embodiments, however, some initial aggregate payments 158 may be calculated at least in part by factoring one or more of the following: the total number of designators 108; the amount of coverage provided under each certificate 152; any of a variety of tax considerations, (e.g., possible limitations related to modified endowment contracts ("MEC"), as discussed below); the interest initial aggregate payment 158 is expected to accrue over time; the anticipated duration of group life insurance policy 102, which may last for multiple years; and/or the effect of each designator's 108 age on the cost of providing insurance. In a particular embodiment, initial aggregate payment 158 may be calculated with reference to a total sum of aggregate costs expected to occur for each certificate 152 (e.g., initial aggregate payment 158 may be less than, substantially equal to, or greater than the total sum of aggregate costs expected to occur for each certificate 152).

In some embodiments of group life insurance policy 102 that include financial account 160, financial account 160 may represent a principal balance including any amounts deposited by sponsor 106 to issuer 104 together with accrued growth due to a return on one or more investments. At least some of the value of financial account 160 may be distributed among one or more investments 162. In some embodiments, each investment 162 may provide a fixed and/or variable return. The value of financial account 160 may be distributed among any combination of investments 162. For example, some investments 162 may represent a municipal bond, a bond fund, a money market account, a corporate security, an index fund, a mutual fund, a real estate investment trust, hedges, swaps, derivatives, or any other appropriate type of investment. In certain embodiments, financial account 160 may include one or more investments 162 associated with multiple financial entities. In various embodiments, group life insurance policy 102 may be structured and managed such that investments 162 may grow in a tax-preferred manner, as explained further below.

In some embodiments of group life insurance policy 102 that include asset transfer agreement 164, asset transfer agreement 164 may include provisions allowing for all or a portion of the value of financial account 160 to be transferred between sub-accounts or categories of investments 162. In certain embodiments, the transfer may be implemented by issuer 104 at the direction of sponsor 106. That is, in certain embodiments, the use of asset transfer agreement 164 may serve to allow sponsor 106 to exercise some direction over the distribution of assets within financial account 160. In some embodiments, issuer 104 may manage and/or maintain financial account 160 and any associated investments 162, at least in part, using an automated or semi-automated computer system, as explained further below.

In certain embodiments, different or additional elements of group life insurance policy 102 may be purchased, elected, or issued at different times. For example, varying certificates 152, elements of interest, investments 162, and/or asset transfer agreements 162 may be purchased, elected, and/or exchanged at the inception of group life insurance policy 102 or at anytime thereafter.

Thus, a particular embodiment of group life insurance policy 102 may be structured such that sponsor 106 may make an initial aggregate payment 158 to issuer 104 in the form of a single cash outlay at the inception of group life insurance policy 102. The initial aggregate payment 158 may have a value calculated to fully or partially fund the obligations of sponsor 106 to issuer 104 throughout a time period that may last multiple days, months, and/or years. In various embodiments, initial aggregate payment 158 may be used in establishing financial account 160. In some embodiments, sponsor 106 may deposit or otherwise transfer additional funds into financial account 160 from time to time as needed. Issuer 104 may automatically and/or periodically withdraw from financial account 160 any premium payments, fees, taxes, etc. associated with maintaining, managing, exchanging, surrendering, etc. the various certificates 152 issued pursuant to group life insurance policy 102. Various embodiments may automatically manage the received initial aggregate payment 158 such that a cash surrender value associated with the group life insurance policy is less than or equal to a total of a remainder of periodic costs yet to be paid for each certificate 152. The use of initial aggregate payment 158 and/or financial account 160 to fund group life insurance policy 102 for multiple years may be explained further with reference to FIG. 2.

Figure 2:
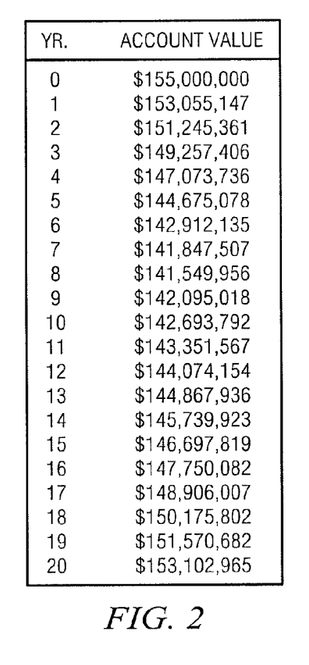
FIG. 2 is a table illustrating an example of the change in value of a financial account associated with a particular embodiment of a group life insurance policy.

FIG. 2 is a table illustrating an example of the change in value of a particular financial account 160 associated with a particular embodiment of group life insurance policy 102. In this example, financial account 160 initially has an approximate value of $155 million, which may be paid, for example, by sponsor 106 to issuer 104 at the inception of group life insurance policy 102. After a period of one year, financial account 160 reduces in value to approximately $153 million. The reduction in value of financial account 160 during the first year of its existence may be caused by any of a variety of factors including, for example, the satisfaction of one or more death benefit 154 claims; fees associated with setting up, maintaining, and/or managing financial account 160; and/or any premium payments, taxes, fees etc. associated with issuing, exchanging, maintaining, and/or surrendering certificates 152.

In the illustrated example, financial account 160 continues to decline in value until sometime during the eighth or ninth year, at which point financial account 160 begins to increase in value. Although the illustrated embodiment includes an inflection point in the changing value of financial account 160 that occurs sometime during the eighth or ninth year, various embodiments may include one or more inflection points that occur at different times or may include no inflection points at all (e.g., financial account 160 may continually decline). The illustrated increase in value of financial account 160 may be due to any variety of reasons. For example, the increase in value may be due to interest accrued by financial account 160 and/or due to the performance of investments 162.

By the end of the twentieth year, in the illustrated example, financial account 160 has a value of approximately $153 million. In this example, therefore, financial account 160 has approximately the same value at the end of a twenty-year time period that it did at the end of the first year, though at least some of the various parties associated with group life insurance policy 102 may have derived any of a variety of various benefits from group life insurance policy 102 throughout this entire time period.

Thus, one advantage of the particular embodiment illustrated in FIG. 2 may be explained with reference to an alternative group life insurance policy 102 that is instead funded by sponsor 106 in multiple payments that cover the expenses, fees, taxes, premiums, etc. as they arise or at periodic intervals. Some alternative arrangements may be thought of as having no financial account 160 or one that is substantially empty. In other words, instead of providing financial account 160 with funds that may be used for a multi-year period, sponsor 106 may instead agree to pay expenses as they incur and otherwise maintain any additional cash on hand, which cash may be used by sponsor 106 at least temporarily for purposes other than funding group life insurance policy 102. Although such an alternative arrangement may provide substantially similar insurance coverage over time as the illustrated embodiment of FIG. 2, at the end of a twenty year period such an alternative arrangement may ultimately consume approximately the same $155 million expenditure without necessarily rendering sponsor 106 one or more assets at the end of a twenty-year period that is equivalent to the one illustrated in FIG. 2.

In some embodiments substantially similar to the one described above with reference to FIG. 2, the growth of financial account 160 may be maximized at least partially by minimizing the deductions made to its principle balance over time. Some deductions may arise, for example, from administrative costs, human labor, maintenance fees, premiums, taxes, etc. associated with group life insurance policy 102. Any of a variety of techniques may be used to minimize these and other deductions made over time to financial account 160. For example, in some embodiments, financial account 160 may be managed such that investments 162 maintain optimized and potentially tax-preferred investment 162 growth by applying a system of rules that may, for example, be configured to: allocate portions of financial account 160 among multiple certificates 152; optimize the issuance, exchange, surrender etc. of certificates 152; and/or ensure group life insurance policy 102 is adequately funded. Various embodiments may provide all, some, or none, of the above functions and features, and/or other functions and features, using an automated or semi-automated system, as explained further with reference to FIGS. 3 through 6.

Figure 3:
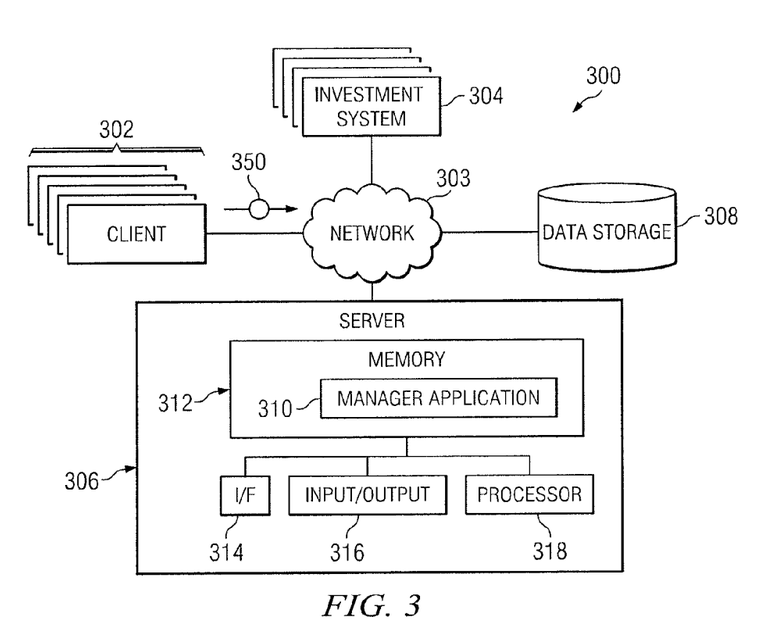
FIG. 3 is a high level diagram of an example system that may be used to provide services pursuant to a particular embodiment of a group life insurance policy.

FIG. 3 is a high level diagram of an example system 300 that may be used to provide services pursuant to a particular embodiment of group life insurance policy 102. In the embodiment illustrated, system 300 includes one or more clients 302, investment systems 304, servers 306, and data storage 308, all coupled together through one or more networks 303. As used throughout this document, the term "couple" and/or "coupled" refers to any direct or indirect communication between two or more elements, whether or not those elements are in physical contact with one another. Although the illustrated embodiment includes various example components, in alternative embodiments one or more of clients 302, investment systems 304, servers 306, and data storage 308 can be excluded from system 300 and/or one or more of these elements may be combined.

Each client 302 may comprise any computing and/or communication device capable of enabling the communication of information to and/or from network 303 or another component in system 300. In some embodiments, the communication between a particular client 302 and one or more of the servers 306 may be performed internally, such as, for example, via a system bus, and/or the communication between a particular client 302 and one or more of the servers 306 may be through network 303. For example, clients 302 may each be capable of communicating one or more requests through network 303, which request(s) may be received and processed, for example, by server 306 using Manager Application 310.

Network 303 may comprise any combination of wireless and/or wireline networks capable of supporting communication between network elements. For example, network 303 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

Each investment system 304 generally refers to any system capable of enabling the provision of financial services. In a particular embodiment, investment system 304 is capable of communicating information to server 306 and/or interpreting communications received from server 306. Some interpreted communications may be used to trigger any of a variety of financial transactions. For example, some financial transactions may include modifying, buying, and/or selling any of a variety of investments 162 (e.g., a municipal bond, a bond fund, a money market account, a corporate security, an index fund, a mutual fund, a real estate investment trust, hedges, swaps, derivatives, or any other appropriate type of investment). In various embodiments, investment system 304 may include one or more clients substantially similar in structure and function to clients 302 and/or one or more servers substantially similar to structure and function as server 306. In a particular embodiment, issuer 104 may own, maintain, and/or control one or more investment systems 304; however, in alternative embodiments, one or more investment systems 304 may be owned, maintained, and/or controlled by an entity other than issuer 104, such as, for example, a bank that provides services to an issuer 104 acting on behalf of sponsor 106.

Server(s) 306 may include any hardware, software, firmware, or combination thereof capable of receiving communication from client(s) 302. In various embodiments, servers 306 may include, for example, one or more directory servers, client servers, file servers, domain name servers, proxy servers, web servers, application servers, computer workstations, data repositories, any combination of the preceding, or any other machine(s) or apparatus capable of receiving communication from client(s) 302. In the illustrated embodiment, server 306 includes memory 312, interface 314, input/output device 316, and one or more processors 318.

Memory 312 may comprise any suitable volatile or nonvolatile storage and retrieval device or combination of devices. In various embodiments, memory 312 may comprise any combination of storage media. Additionally, all or part of memory 312 may reside locally within server 306 or could reside remotely from and accessible to server 306.

Manager Application 310, discussed further below, resides within memory 312 of server 306. Manager Application 310 may comprise software, firmware, data compilations, and/or a combination thereof.

Interface 314 may comprise any device(s) that may be used (e.g., by a person, or by another device or system) to communicate with server 306. For example, one or more keyboards or a mouse may be considered input interfaces of server 306 while monitors and printers may be considered output interfaces of server 306. Input/output device 316 may refer to one or more devices capable of implementing the communication between server 306 and one or more other devices (e.g., one or more of clients 302, one or more investment systems 304, a display, or another information processing system).

Data storage 308 may represent one or more databases, computer components, devices, and/or recording media capable of retaining digital data. For example, data storage 308 may be capable of retaining at least a portion of the parameters related to each certificate 152 issued pursuant to particular embodiments of group life insurance policy 102. Data storage 308 may comprise a magnetic data storage device (e.g., a diskette or a hard disk drive), an optical disc storage medium (e.g., a Laserdisc), a magneto-optical device (e.g., a MiniDisc), random access memory (RAM), or any other suitable volatile or nonvolatile storage and retrieval device or combination of devices.

In operation, system 300 may be used to provide services pursuant to particular embodiments of group life insurance policy 102. For example, system 300 be used to maintain and/or manage group life insurance policies that provide sponsor-owned insurance coverage for multiple designators 108 employed by respective sponsors 106; optimize financial account(s) 160 such that investment(s) 162 have a higher probability of maximized investment 162 growth; perform administrative functions pursuant to particular embodiments of group life insurance policy 102; determine values associated with the various elements 150-164 of particular embodiments of group life insurance policy 102; monitor whether financial account(s) 160 are adequately funded; generate reports; communicate reports; withdraw from financial account(s) 160 any premium payments, fees, taxes, etc. associated with particular embodiments of group life insurance policy 102; maintain, manage, exchange, surrender, etc. the various certificates 152 issued pursuant to particular embodiments of group life insurance policy 102; ensure certificates 152 comply with various rules; and/or request, receive, interpret, and/or respond to information received from client(s) 302, investment system(s) 304, and/or data storage(s) 308. In some embodiments, Manager Application 310 may be operable, when executed by processor(s) 318, to autonomously or semi-autonomously provide all, some, or none of these services.

Figure 4:
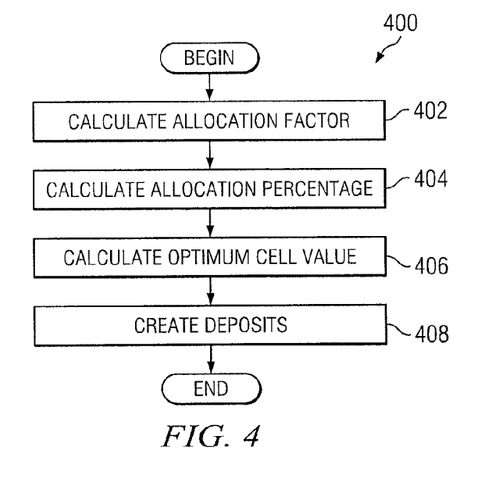
FIG. 4 is a flowchart illustrating example steps for providing a plurality of exchangeable certificates pursuant to a particular embodiment of a group life insurance policy.

FIG. 4 is a flowchart 400 illustrating example steps for providing a plurality of exchangeable certificates 152 pursuant to a particular embodiment of group life insurance policy 102. In this particular example, group life insurance policy 102 includes a variable universal life contract that is substantially funded at the inception of group life insurance policy 102 and structured to provide basic life insurance benefits for multiple designators 108 employed by sponsor 106. At the outset of group life insurance policy 102, a certificate 152 is issued for each designator 108 that represents parameters associated with the designator's 108 basic life insurance benefits, including, for example, the portion of initial aggregate payment 158 and/or financial account 160 allocated to the certificate 152. Any of a variety of steps may be used to determine these various parameters. In this particular example, the steps generally include calculating an allocation factor, calculating an individual allocation percentage, calculating an optimum cell value ("OCV"), and creating deposits.

Figure 5A:
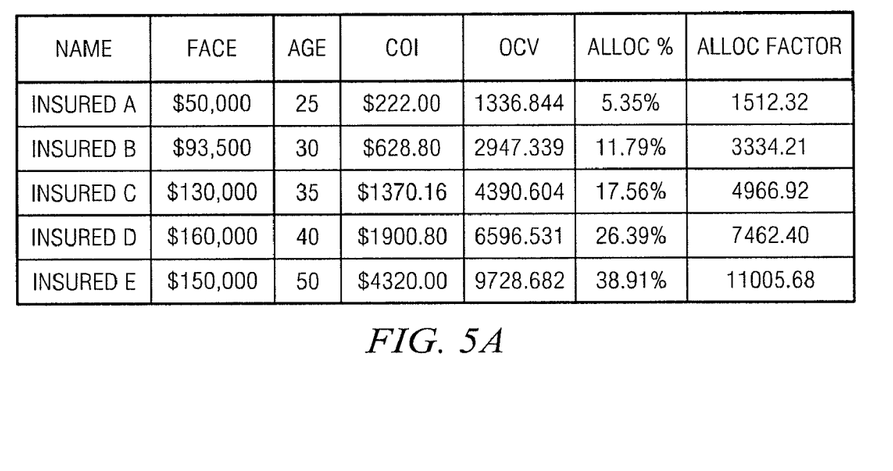
FIGS. 5A-5C illustrate example contents of respective data files that may be used to manage various certificates issued pursuant to a group life insurance policy according to a particular embodiment.

Allocation factors are calculated in step 402 for each certificate 152. For example, a number may be provided for each certificate 152 indicative of a value allocated to each certificate 152 relative to other certificates 152. Various factors may be used as inputs in calculating the allocation factor. For example, factors may include the age, gender, health, salary, years of employment, job code, lifestyle, etc. of a respective designator 108. In a particular embodiment, the allocation factor may be calculated using various industry standards, rules and/or tests, such as, for example, the seven-pay limit. One example of results that may be returned by the calculations performed in step 402 is illustrated in the table of FIG. 5A in the right-most column labeled "ALLOC FACTOR."

Thus, in some embodiments, the cost of providing a given amount of life insurance pursuant to particular certificates 152 may be lower for younger designators 108 than it is for older designators 108. In some cases, therefore, the periodic premiums that may be deducted from the cash value of any given certificate 152 (as discussed below) may be higher for an older designator 108 as compared to a comparable certificate 152 for a younger designator 108. As a result, the initial premium allocated or otherwise paid for a particular certificate 152 (which may generate any cash value used to fund the insurance protection thereunder) may be lower for younger designators 108 and higher for older designators 108, assuming, for example, at least some, if not all, of the other pertinent variables (e.g., salary, health, lifestyle, job grade, etc.) of the younger and older designators 108 are substantially comparable.

Allocation percentages are calculated in step 404 for each certificate 152. For example, each allocation percentage may be calculated by dividing the sum total of all of the allocation factors calculated in step 402 by a respective allocation factor. In other words, the allocation percentages may have a collective sum of one-hundred percent. One example of results that may be returned by the calculations performed in step 404 is illustrated in the table of FIG. 5A in the column labeled "ALLOC %." More specifically, a summation of the allocation factors in FIG. 5A totals 28281.53; and the first allocation percentage may thus be calculated by dividing 1512.32 by this summation, which returns approximately 5.35% (i.e. 5.34737% rounded to the nearest hundredth).

Each OCV is calculated in step 406. The OCVs may be calculated, for example, by multiplying values associated with initial aggregate payment 150 and/or financial account 160 by the allocation percentages calculated in step 404. One example of results that may be returned by the calculations performed in step 406 is illustrated in the table of FIG. 5A in the column labeled "OCV." In the illustrated example, financial account 160 has a total value of $25,000; and the first OCV may thus be calculated by multiplying this value by the allocation percentage of 5.34737%, which returns a value of approximately 1336.84. In various embodiments, an OCV may represent the optimum value of an initial deposit associated with a particular certificate 152. Thus, OCV may be used to optimize exchanges of certificates, as explained further below.

Deposits are created for each certificate 152 in step 408. For example, the creation of deposits may involve allocating and/or reallocating all or a portion of the funds associated with initial aggregate payment 158 and/or financial account 160 among multiple certificates 152. According to a particular embodiment, the allocation of financial account 160 may be initialized by creating deposits for each certificate 152 that are substantially equal to a respective OCV calculated for the certificate 152; however, in certain embodiments, the reallocation of financial account 160 may change the deposits and/or the OCV calculations from their initial values. In certain cases, reallocation of financial account 160 may involve issuing new certificates 152 sometime after a prior allocation of financial account 160.

Although various example calculations are disclosed herein, various embodiments may use any of a variety of additional or alternative calculations without departing from the scope of the present disclosure. For example, particular embodiments may calculate a cost of insurance value ("COI"). The calculation(s) used to determine each COI may indicate, for example, a minimum amount of money that may be allocated to a certificate 152 without causing the certificate 152 to lapse. In various embodiments, the COI calculations may use a number representing the duration of time group life insurance policy 102 is expected to endure. That is, each COI may indicate the amount of money expected to be withdrawn from the cash value allocated to a respective certificate over the life of group life insurance policy 102; and each COI calculation may thus involve, for example, multiplying an annual premium associated with a respective certificate 152 by the number of years group life insurance policy is expected to endure. One example of results that may be returned by some COI calculations is illustrated in the table of FIG. 5A in the column labeled "COI."

In some embodiments, a summary of the data associated with group life insurance policy 102 may be created using at least some of the values calculated in one or more of the above steps 402-406. The summary may be reviewed by one or more persons and/or may be subject to further processing. Referring to the table of FIG. 5A, for example, a user may review the illustrated table and optionally decide to increase the face amount of a certificate 152 associated with Insured E while decreasing the face amount of another certificate associated with Insured C; and/or a user may, for example, choose to increase the face amount of both certificates 152 associated with Insured A and Insured B. Some changes may immediately or eventually incur one or more charges, which in some cases may be automatically deducted from account 160 accordingly. Thus, various embodiments may provide the flexibility of modifying, customizing, and/or optimizing any previously calculated parameters for financial certificate 152. These parameters may then be reloaded into system 300.

In various embodiments, at least portions of steps 402-406 may be performed by processor(s) 318 executing logic embodied in computer-readable media. For example, a particular embodiment of Manager Application 310 may be operable, when executed by processor(s) 318, to provide group life insurance policy 102 with multiple certificates 152. In addition, Manager Application 310 may be further operable, when executed by processor(s) 318, to maintain, manage, exchange, surrender, etc. the various certificates 152 issued pursuant to group life insurance policy 102. In a particular embodiment, for example, Manager Application 310 may monitor for one or more events, notices, and/or data inputs indicating one or more designated beneficiaries are entitled to proceeds from respective death benefits 154.

In addition to monitoring for death-related events, Manager Application 310 may be further operable to monitor for any of a variety of non-death-related events and reallocate financial account 160 among at least some of certificates 152 accordingly. For example, Manager Application 310 may monitor for data indicating a change in a respective relationship between one or more designators 108 and sponsor 106. In a particular embodiment, Manager Application 310 may determine that one or more designators 108 are no longer employed by sponsor 106. In response, Manager Application 310 may reallocate financial account 160 in a manner that no longer reflects the surrendered certificate(s) 152; or, in alternative embodiments, Manager Application 310 may respond by maintaining at least some of the certificates 152 corresponding to the ex-employee(s) while optionally making one or more adjustments to their respective parameters (e.g., the face amount coverage, the COI, the OCV, etc.), which may ultimately affect the allocation of financial account 160 among certificates 152.

In another example of monitoring for non-death-related events, Manager Application 310 may determine that sponsor 106 no longer employs one or more previously employed designators 108 and that sponsor 106 has hired one or more new designators 108. In response, Manager Application 310 may exchange the certificate(s) 152 surrendered by the employment termination(s) with one or more new certificates 152 that may be issued for the newly hired designator(s) 108.

In yet another example of monitoring for non-death-related events, Manager Application 310 may determine one or more events have occurred (e.g., the change in salary, duties, job grade, health, selectable options, etc. of one or more designators 108) that may affect the parameters of one or more certificates 152. In response, Manager Application 310 may adjust financial account 160 accordingly and/or generate a report that indicates sponsor 106 needs to supplement financial account 160 with additional funds.

Figure 5B:
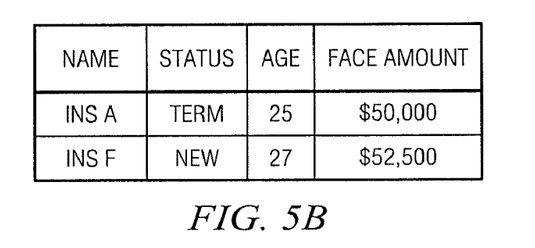
Figure 5C:
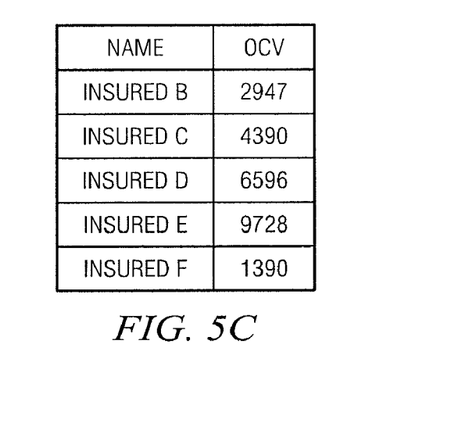

FIGS. 5A though 5C illustrate example contents of respective data files that may be used to allocate financial account 160 among various certificates 152 issued pursuant to group life insurance policy 102 according to a particular embodiment. According to this particular embodiment, group life insurance policy 102 comprises a variable universal life contract that may be substantially funded at its inception and structured to provide basic life insurance benefits for multiple designators 108 while they are employed by sponsor 106. That is, the termination of employment of one or more designators 108 may also result, at some point, in the termination of life insurance coverage for those designators 108 and the surrender of their certificates 152.

In a particular embodiment, the management of certificates 152 by Manager Application 310 may be implemented at least partially in accordance with input received from client(s) 302. For example, sponsor 106 may use client(s) 302 to communicate one or more data files 350 to server 306. The data files 350 may include, for example, information pertaining to one or more of the following: the hiring of one or employee designators 108 by sponsor 106; the termination of employment of one or more designators 108 previously employed by sponsor 106; a change in salary, health, job grade, lifestyle, selectable options etc. of one or more employee designators 108; the issuance of one or more certificates 152; the modification of one or more certificates 152; the surrender of one or more certificates 152; asset transfers of financial account 160; and/or any of a variety of other item(s) of information pertaining to managing and/or maintaining financial account 160.

In some embodiments, the input(s) received from client(s) 302 may be transformed, parsed, formatted, mapped, etc. into a form that may be interpreted by Manager Application 310. For example, one or more human resources and/or one or more automated programs may be used to generate a data table with information extracted and/or derived from the communicated data file(s) 350. In some embodiments, Manager Application 310 may perform at least a portion of the data transformation, parsing, formatting, etc. In various embodiments, the processes associated with receiving, interpreting, and/or responding to information communicated by sponsor(s) 106 to system 300 via client(s) 302 may occur, for example, at any suitable periodic interval(s) (e.g., weekly, bi-monthly, monthly, semi-annually, annually, etc.), and/or upon receipt of data file(s) 350 from client(s) 302. One particular example of input that may be communicated by sponsor 106 via client(s) 302 is described further with reference to FIG. 5B.

FIG. 5B illustrates example contents of a portion of a data file 350 that may be used to allocate and/or reallocate at least a portion of financial account 160 among multiple certificates 152. In this example, the illustrated portion of data file 350 includes information indicating the termination of employment of a designator 108 represented as "INS A" and the hiring of a new employee designator 108 represented as "INS F." This information, and/or a modified representation thereof, may be interpreted by particular embodiments of Manager Application 310 to determine one or more optimal reallocations of financial account 160 that may be used to accommodate at least some of the changes indicated in data file 350. More specifically, Manager Application 310 may at least partially interpret the portion of data file 350 illustrated in FIG. 5B, or a modified representation thereof, as a request to reallocate the portion of financial account 160 previously allocated among the multiple designators 108 represented in FIG. 5A (INSURED A-E), to the different set of designators 108 represented in FIG. 5C (INSURED B-F).

Any of a variety of processes may be used to reallocate all or a portion of financial account 160 to accommodate at least some of the input received from client(s) 302. In some embodiments, Manager Application 310 may store (e.g., in data storage 308) an interpretation of input received from client(s) 302 in outgoing and incoming queues. In the illustrated embodiment, for example, data related to the designator 108 represented in FIG. 5A as INSURED A may be stored in an outgoing queue; and data related to the designator 108 represented in FIG. 5C as INSURED F may be stored in an incoming queue. In various embodiments, the input and output queues may be updated to populate a batch request comprised of multiple inputs that may be received serially at different times or in parallel at substantially coincident times.

In various embodiments, the reallocation of financial account 160 may be performed in accordance with one or more processes configured to increase the likelihood that each certificate 152 is optimally funded. For example, a particular embodiment of Manager Application 310 may exchange one certificate 152 (the "surrendering" certificate 152) for another certificate 152 (the "pending" certificate) if Manager Application 310 determines one or more of the following rules applies: the OCV calculated for the pending certificate 152 is within a predetermined reallocation tolerance of the OCV for the surrendering certificate 152 ("Rule A"); the surrendering certificate 152 has a lower calculated OCV than the pending certificate, though the calculated COI of the surrendering certificate 152 may be greater than the calculated COI of the pending certificate 152 ("Rule B"); and/or the calculated OCV of the surrendering certificate 152 is greater than the calculated OCV of the pending certificate 152 and an optional timer associated with the pending certificate 152 has expired ("Rule C"). In some cases, Manager Application 310 may determine a particular update comprises no surrendered certificate 152 and that an optional timer associated with a pending certificate 152 has expired ("Rule D"), and in response perform a suitable exchange or reallocation accordingly. Although some of the processes that may be used by Manager Application 310 are described in the context of four distinct rules (i.e., Rule A, Rule B, Rule C, and Rule D), alternative embodiments may include all, some, or none of the above rules and/or may include any of a variety of alternative rules and/or processes.

Figure 6:
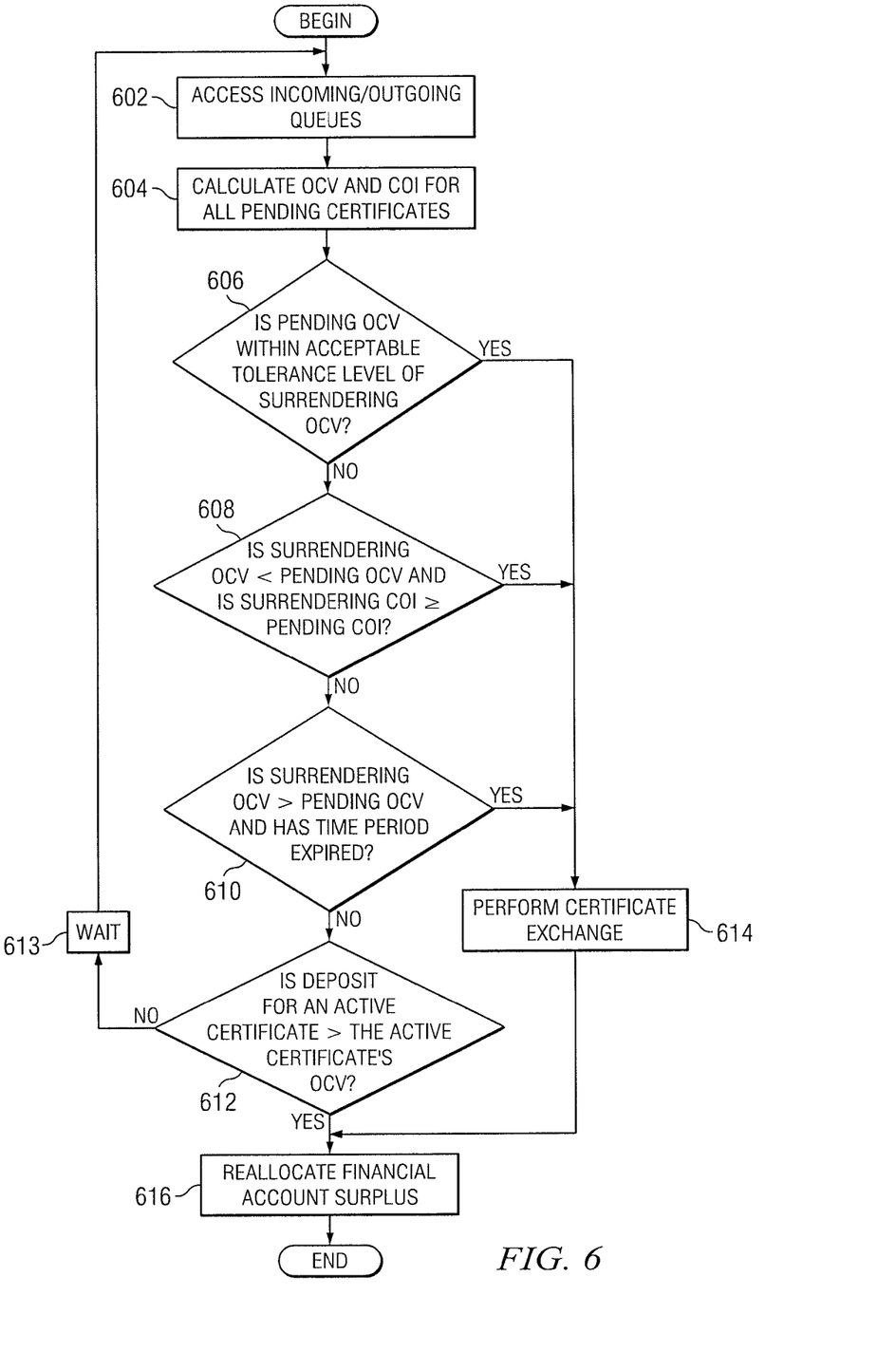
FIG. 6 is a flowchart illustrating example steps for managing the exchanges of a plurality of certificates pursuant to a particular embodiment of a group life insurance policy.

FIG. 6 is a flowchart 600 illustrating example steps for managing the exchanges of certificates 152 pursuant to a particular embodiment of group life insurance policy 102. At step 602, Manager Application 310 accesses the incoming and outgoing queues. Referring again to the illustrated example of FIG. 5C, for example, a particular embodiment of Manager Application 310 may access incoming and outgoing queues and determine that a pending certificate 152 for a new designator 108 represented as INSURED F lacks one or more parameters.

At step 604, Manager Application 310 may calculate any missing parameters (e.g., OCV and COI parameters) for pending certificate(s) 152 using steps substantially similar to at least some of the example steps 402-406 described previously with reference to flowchart 400 of FIG. 4. For example, an allocation factor may be initialized by recalculating all the allocation factors of a hypothetical data set that includes at least some or all of the active certificates, INSURED F and any other pending entries of the incoming cue, but that omits INSURED A and any the entries of the outgoing queue. The allocation factors calculated for the incoming queue may then be used, for example, to calculate respective OCVs and COIs in a manner substantially similar to that described previously.

In the illustrated embodiment of FIG. 5C, for example, INSURED F has a calculated OCV of 1390 while the OCVs for INSURED B-E remain unchanged. Thus, in this particular example, the sum of the illustrated OCVs in FIG. 5C is slightly greater than that of FIG. 5A. In other words, the value of financial account 160 may be insufficient to fund each of the optimal cell values ("OCV"); and thus at least one of the issued certificates 152 may have a corresponding deposit, or a respective allocated portion of financial account 160, that is less than its calculated OCV. In various embodiments, if the discrepancy between a total of the deposits and a total of the OCVs is larger than a predetermined threshold and/or lasts longer than a predetermined time period, Manager Application 310 may, for example, generate a report prompting for an additional charge that may be applied to financial account 160.

According to a particular application of an embodiment using Rule A, at step 606, Manager Application 310 may determine whether the OCV of 1390 for the pending certificate 152 of INSURED F is within a predetermined reallocation tolerance of any of the OCVs for the surrendering certificate(s) 152 in the outgoing queue. Any suitable predetermined tolerance level(s) may be used. For example, certain embodiments may use a tolerance level within the range of 1% to 50% or 2% to 15%, including any fractional decimal in between. In a particular embodiment, an approximately 5% tolerance level may be used. A lower reallocation tolerance may, for example, decrease the number of candidate OCVs in the outgoing queue that satisfy Rule A; however, in certain cases, a lower reallocation tolerance may also increase the likelihood that a particular exchange satisfies rules applicable to a tax-preferred status. For example, in some embodiments, a higher reallocation tolerance that enables the exchange of a surrendering certificate 152 with relatively high face amount coverage (i.e., a higher OCV) for a pending certificate 152 with relatively low face amount coverage may risk classification of the pending certificate 152 for tax purposes as a modified endowment contract ("MEC"), which may have consequences that are less desirable than some alternative classifications.

Using a reallocation tolerance of approximately 5.0%, for example, Manager Application 310 may determine that an exchange of the surrendering certificate 152 of INSURED A for the pending certificate 152 of INSURED F satisfies the requirements of Rule A and is optimal in light of at least some other possible exchange scenarios that may be implemented.

In response, Manager Application 310 may perform, in step 614, a reallocation of group life insurance policy 160 that includes at least this optimized exchange; and substantially similar procedures may be performed to exchange any remaining certificates 152 in the incoming and outgoing queues that likewise satisfy Rule A.

According to a particular application of an embodiment using Rule B, at step 608, Manager Application 310 may determine whether the OCV of a surrendering certificate in the outgoing queue is less than an OCV of a pending certificate in the incoming queue and whether the COI of the surrendering certificate is greater than or equal to the COI of the pending certificate. For example, a pending certificate 152 for a newly hired designator 108 represented as INSURED G may be placed in the incoming queue for a newly hired designator 108 aged 34. The pending certificate 152 may, for example, have a face amount coverage of $89,000 and calculated OCV and COI values of 750 and 1845, respectively. Although an exchange in compliance with Rule A may not be available at a given point in time, In step 608, Manager Application 310 may determine that an exchange of such a pending certificate 152 with a particular surrendering certificate 152 substantially similar to that of INSURED B may comply with Rule B; and Manager Application 310 may perform an exchange accordingly in step 614. In various embodiments, Manager Application 310 may later reallocate financial account 160 in a manner that better optimizes the portion allocated to the INSURED G certificate.

In some embodiments, Manager Application 310 may select a particular set of processes from among multiple options in accordance with a predetermined hierarchy. In a particular embodiment, for example, Manager Application 310 may implement exchanges that maximize compliance with Rule A as a highest priority, Rule B as a second highest priority, and so forth. Various embodiments that preferentially apply exchange scenarios that maximize compliance with rules substantially similar to Rules A and B over alternative exchange scenarios having less of a compliance with such rules may have the advantage of minimizing taxes associated with such exchanges. For example, some exchange scenarios that maximize compliance with Rules A and/or B may minimize the reapplication of premium taxes that may have already been paid on the surrendering certificate(s) 152. At various points in time, however, it may not be possible to exchange a particular surrendering certificate 152 in the outgoing queue for a pending certificate 152 in the incoming queue in a manner that complies with Rules A and/or B.

According to a particular application of an embodiment using Rule C, in step 610, Manager Application 310 may determine that the OCV of a surrendering certificate in the outgoing queue is greater than the OCV of a pending certificate in the incoming queue; and Manager Application 310 may further determine that the surrendering and pending certificates 152 could not be exchanged with each other or with other certificates 152 in accordance with more optimal rules (e.g., Rule A or Rule B) during a predetermined time period. Under such conditions, Manager Application 310 may determine the pending and surrendering certificates 152 may be exchanged in compliance with Rule C and perform the exchange accordingly in step 614. As part of the reallocation of financial account 160 associated with the exchange, Manager Application 310 may apply the surplus in the actual deposit of the surrendered certificate 152 in a manner that better optimizes another exchange. For example, a pending certificate 152 having an OCV of 3972 and a COI of 993 may be exchanged, in compliance with Rule C, with a surrendering certificate 152 having an OCV of 4390; and the surplus of $418, in this case, may optionally be applied to one or more other exchanges and/or among some other existing certificate(s) 152, in step 616, in order to more fully optimize how financial account 160 is allocated among certificates 152.

According to a particular application of an embodiment using Rule D, in step 612, Manager Application 310 may determine that the deposit for one or more active certificates 152 (i.e. not in the incoming or outgoing queues) is greater than the active certificate(s) 152 respective OCV; and Manager Application 310 may further determine that one or more pending and/or surrendering certificates 152 in the incoming/outgoing queues could not be exchanged in accordance with more optimal rules (e.g., Rules A, Rule B, or Rule C) during a predetermined time period. If the time period expires and one or more active certificates 152 satisfy the conditions of Rule D, Manager Application 310 may withdraw, in step 616, at least some of this surplus to fund one or more of the certificates 152 that have remained in the incoming queue for at least the predetermined time period. Otherwise, in step 613, Manager Application 310 may wait for an event (e.g., the toll of a time period, the addition of certificate 152 to the incoming queue, and/or some other event) and then loop back to step 602 to determine if any change to the incoming/outgoing queues enables more a more optimal certificate 152 exchange (e.g., an exchange per Rule A, Rule B, or Rule C).

Thus, particular embodiments of a group life insurance policy may be autonomously or semi-autonomously managed at least in part by providing a group life insurance policy with multiple certificates 152 funded by sponsor 106. Each certificate 152 may provide a death benefit to at least one beneficiary designated by a respective designator 108 who is insured under the certificate 152. Sponsor 106 may agree to pay issuer 104 an initial aggregate payment 158 as a lump sum in exchange for certificates 152. At least a respective portion of the determined initial aggregate payment 158 may be allocated to each certificate 152. Particular embodiments may monitor for events that may affect certificates 152. In response to a detection of a particular non-death related event, an affected certificate 152 may be exchanged for a new certificate 152 that provides a death benefit to at least one beneficiary designated by a respective designator 108. The exchange of certificates 152 may include reallocating to the new certificate 152 at least a portion of the portion of initial aggregate payment 160 initially allocated to the affected certificate 152.

In accordance with various embodiments, at least a portion of initial aggregate payment 158 may be used to establish a financial account 160. Financial account 160 may contains fund allocable to multiple certificates 152 issued pursuant to particular embodiments of group life insurance policy 102. Manager Application 310 may optimize the allocation of financial account 160 among certificates 152 in a manner that may increase the potential for eventual growth of financial account 160 and the magnitude of such growth. In some embodiments, at least some of the allocation may be performed by Manger Application 310 automatically and in response to input received from sponsor 106 via clients 302. The input may be used to create incoming and outgoing queues for pending and surrendering certificates 152, respectfully. Various rules may be applied to determine if one or more surrendering certificates 152 may be exchanged for one or more pending certificates in a manner that optimizes the allocation of financial account 160 among the active certificates 152.

In addition to the advantages described above, certain embodiments may provide any of a variety of additional advantages. For example, some embodiments may enable tax-preferred growth of various investments 162 related to group life insurance policy 102. In addition, some embodiments may ensure each certificate 152 is adequately funded, but not over-funded, so as to be classified for tax purposes as a life insurance contract that is not a modified endowment contract ("MEC"). In various embodiments, the value and/or services provided by issuer 104 to sponsor 106 pursuant to group life insurance policy 102 may be at least partially implemented by logic embodied in computer-readable media. Some logic may be operable, when executed by processor(s) 318, to automatically and/or semi-automatically reallocate at least portions of financial account 160 among multiple certificates 152 in accordance with one or more inputs and in a manner that optimizes the allocation of financial account 160. The reallocation may, for example, be configured to increase the likelihood that investments 162 associated with group life insurance policy 102 may grow in a tax-preferred manner.

Although various embodiments of the present disclosure have been explained in the context of group life insurance policies, the teachings of the present disclosure may apply to any of a variety of other types of financial instruments. For example, in various alternative embodiments at least some of the teachings of the present disclosure may be used to fund post-employment obligations, such as, for example, retirement health policies.

It should also be noted that where a flowchart is used to demonstrate various aspects of particular embodiments, it should not be construed to be limited to any particular logic flow or logic implementation. The described logic may be partitioned into different logic blocks (e.g., programs, modules, functions, or subroutines) without changing the overall results. Often, logic elements may be added, modified, omitted, performed in a different order, or implemented using different logic constructs (e.g., logic gates, looping primitives, conditional logic, and other logic constructs).

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments, including future operating systems or environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). In a particular embodiment, all or a portion of Manager Application 310 may be embodied in any of a variety of other suitable computer-readable medium, such as, for example, removable media.

Although various embodiments have been described herein, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for managing a group life insurance policy with a plurality of certificates, each certificate providing a death benefit to at least one beneficiary designated by a respective person insured according to the certificate, the group life insurance policy at least partially funded by a financial account comprising one or more payments paid by a sponsor, the one or more payments expected to fund the group life insurance policy for a multi-year period, the method comprising:
for each certificate of the plurality of certificates:
calculating an optimum allocation value, the optimum allocation value indicative of a respective portion of the financial account determined to be optimally allocated to the certificate;
creating a deposit for the certificate by allocating a respective portion of the financial account to the certificate, the allocated respective portion having a value based at least in part on the calculated optimum allocation value; and
in response to one or more inputs, reallocating the financial account such that a new deposit is created for a new certificate using at least a portion of the financial account allocated to the plurality of certificates in creating the deposits for the plurality of certificates.

2. The method of claim 1, wherein reallocating the financial account comprises exchanging a surrendered certificate of the plurality of certificates for the new certificate, the exchange performed in accordance with one or more of a plurality of computer-implemented rules.

3. The method of claim 2, wherein the plurality of computer-implemented rules comprise at least two different priority levels.

4. The method of claim 2, wherein a first rule of the plurality of computer-implemented rules comprises performing the exchange based at least partially on determining the optimum allocation value calculated for the surrendered certificate and an optimum allocation value calculated for the new certificate are within a predetermined reallocation tolerance of each other.

5. The method of claim 2, further comprising:
calculating a cost of insurance for each certificate of the plurality of certificates, the allocated respective portion of each certificate having a value greater than or equal to the calculated cost of insurance for the certificate;
wherein a first rule of the plurality of computer-implemented rules comprises performing the exchange based at least partially on:
determining the optimum allocation value calculated for the surrendered certificate is less than an optimum allocation value calculated for the new certificate; and
determining the cost of insurance calculated for the surrendered certificate is greater than a cost of insurance calculated for the new certificate.

6. The method of claim 2, wherein a first rule of the plurality of computer-implemented rules comprises performing the exchange based at least partially on:
determining the optimum allocation value calculated for the surrendered certificate is greater than an optimum allocation value calculated for the new certificate; and
determining an event has occurred.

7. The method of claim 6, wherein the event is the expiration of a timer.

8. The method of claim 1, wherein a sum total of the optimum allocation values calculated for the plurality of certificates substantially equals a total value of the financial account.

9. The method of claim 1, wherein each certificate of the plurality of certificates is configured to qualify for tax purposes as a life insurance contract without being characterized as a modified endowment contract.

10. The method of claim 1, wherein each certificate of the plurality of certificates is configured to qualify for tax purposes as a modified endowment contract.

11. The method of claim 1, the method further comprising calculating a cost of insurance for each certificate of the plurality of certificates, the allocated respective portion of each certificate having a value greater than or equal to the calculated cost of insurance for the certificate;
wherein the cost of insurance calculated for each certificate of the plurality of certificates is at least partially based one or more factors selected from the group consisting of:
a current age of a respective one of the plurality of persons;
a salary of a respective one of the plurality of persons;
a health-defining factor of a respective one of the plurality of persons; and
a job grade of a respective one the plurality of persons.

12. The method of claim 1, the method further comprising calculating a cost of insurance for each certificate of the plurality of certificates, wherein cost of insurance calculated for each certificate of the plurality of certificates is at least partially based on the net amount at risk for the certificate.

13. The method of claim 1, wherein the death benefit provided to at least one beneficiary designated by the respective person for each certificate of the plurality certificates is conditional upon a relationship between the respective person and the sponsor.

14. The method of claim 13, wherein the condition is employment of the respective person by the sponsor.

15. The method of claim 1, further comprising managing the payment of one or more premiums for each certificate of the plurality of certificates by automatically making one or more corresponding withdrawals from the financial account.

16. The method of claim 1, the method further comprising:
calculating a cost of insurance for each certificate of the plurality of certificates, the allocated respective portion of each certificate having a value greater than or equal to the calculated cost of insurance for the certificate; and
calculating an initial payment to be paid by the sponsor as a lump sum in exchange for the plurality of certificates, the calculated initial payment less than or equal to a total sum of the cost of insurance calculated for each certificate of the plurality of certificates.

17. A computer-implemented system for managing a group life insurance policy with a plurality of certificates, each certificate providing a death benefit to at least one beneficiary designated by a person insured according to the certificate, the group life insurance policy at least partially funded by a financial account comprising one or more payments paid by a sponsor, the one or more payments expected to fund the group life insurance policy for a multi-year period, the system comprising:
  one or more processors operable to execute logic embodied in computer-readable media, the logic operable, when executed by the one or more processors, to:
    calculate an optimum allocation value for each certificate of the plurality of certificates, the optimum allocation value indicative of a respective portion of the financial account determined to be optimally allocated to the certificate;
    allocate a respective portion of the financial account to each certificate of the plurality of certificates, the allocated respective portion having a value based at least in part on the calculated optimum allocation value; and
    in response to one or more inputs, reallocate the financial account such that a new deposit is created for a new certificate using at least a portion of the financial account allocated to the plurality of certificates in creating the deposits for the plurality of certificates.

18. The computer-implemented system of claim 17, wherein the logic is further operable, when executed by the one or more processors, to reallocate the financial account by exchanging a surrendering certificate of the plurality of certificates for the new certificate, the exchange performed in accordance with one or more of a plurality of rules having at least two different priority levels.

19. The computer-implemented system of claim 17, wherein the logic is further operable, when executed by the one or more processors, to implement a first rule of the plurality of rules by determining the optimum allocation value calculated for the surrendering certificate and an optimum allocation value calculated for the new certificate are within a predetermined reallocation tolerance of each other.

20. The computer-implemented system of claim 17, wherein the logic is further operable, when executed by the one or more processors, to:
  calculate a cost of insurance for each certificate of the plurality of certificates, the allocated respective portion having a value greater than or equal to the calculated cost of insurance for the certificate; and
  implement a first rule of the plurality of rules by:
    determining the optimum allocation value calculated for the surrendering certificate is less than an optimum allocation value calculated for the new certificate; and
    determining the cost of insurance calculated for the surrendering certificate is greater than a cost of insurance calculated for the new certificate.

21. The computer-implemented system of claim 17, wherein the logic is further operable, when executed by the one or more processors, to implement a first rule of the plurality of rules by:
  determining the optimum allocation value calculated for the surrendering certificate is greater than an optimum allocation value calculated for the new certificate; and
  determining an event has occurred.

22. The computer-implemented system of claim 21, wherein the event is a timer.

23. The computer-implemented system of claim 17, wherein a sum total of the optimum allocation values calculated for the plurality of certificates substantially equals a total value of the financial account.

24. The computer-implemented system of claim 17, wherein each certificate of the plurality of certificates is configured to qualify for tax purposes as a life insurance contract without being characterized as a modified endowment contract.

25. The computer-implemented system of claim 17, wherein each certificate of the plurality of certificates is configured to qualify for tax purposes as a modified endowment contract.

26. The computer-implemented system of claim 17, wherein the logic is further operable, when executed by the one or more processors, to calculate a cost of insurance for each certificate of the plurality of certificates, the allocated respective portion of each certificate having a value greater than or equal to the calculated cost of insurance for the certificate;
  wherein the cost of insurance calculated for each certificate of the plurality of certificates is at least partially based one or more factors selected from the group consisting of:
    a current age of a respective one of the plurality of persons;
    a salary of a respective one of the plurality of persons;
    a health-defining factor of a respective one of the plurality of persons; and
    a job grade of a respective one the plurality of persons.

27. The computer-implemented system of claim 17, wherein the logic is further operable, when executed by the one or more processors, to calculate a cost of insurance for each certificate of the plurality of certificates, wherein cost of insurance calculated for each certificate of the plurality of certificates is at least partially based on the net amount at risk for the certificate.

28. The computer-implemented system of claim 17, wherein the death benefit provided to at least one beneficiary designated by the respective person for each certificate of the plurality certificates is conditional upon a relationship between the respective person and the sponsor.

29. The computer-implemented system of claim 28, wherein the condition is employment of the respective person by the sponsor.

30. The computer-implemented system of claim 17, wherein the logic is further operable, when executed by the one or more processors, to manage the payment of one or more costs for each certificate of the plurality of certificates by automatically making one or more corresponding withdrawals from the financial account.

31. The computer-implemented system of claim 17, wherein the logic is further operable, when executed by the one or more processors, to:
  calculate a cost of insurance for each certificate of the plurality of certificates, the allocated respective portion of each certificate having a value greater than or equal to the calculated cost of insurance for the certificate; and
  calculate an initial payment to be paid by the sponsor as a lump sum in exchange for the plurality of certificates, the calculated initial payment less than or equal to a total sum of the cost of insurance calculated for each certificate of the plurality of certificates.

32. A non-transitory tangible computer-readable media embodying logic, such that the logic is executed by one or more processors to:
  calculate an optimum allocation value for each certificate of the plurality of certificates, the optimum allocation value indicative of a respective portion of the financial account determined to be optimally allocated to the certificate;

allocate a respective portion of the financial account to each certificate of the plurality of certificates, the allocated respective portion having a value based at least in part on the calculated optimum allocation value; and in response to one or more inputs, reallocate the financial account such that a new deposit is created for a new certificate using at least a portion of the financial account allocated to the plurality of certificates in creating the deposits for the plurality of certificates.

33. The computer-readable media of claim 32, wherein the logic is further operable, when executed by the one or more processors, to reallocate the financial account by exchanging a surrendering certificate of the plurality of certificates for the new certificate, the exchange performed in accordance with one or more of a plurality of rules having at least two different priority levels.

34. The computer-readable media of claim 32, wherein the logic is further operable, when executed by the one or more processors, to implement a first rule of the plurality of rules by determining the optimum allocation value calculated for the surrendering certificate and an optimum allocation value calculated for the new certificate are within a predetermined reallocation tolerance of each other.

35. The computer-readable media of claim 32, wherein the logic is further operable, when executed by the one or more processors, to:

calculate a cost of insurance for each certificate of the plurality of certificates, the allocated respective portion having a value greater than or equal to the calculated cost of insurance for the certificate; and implement a first rule of the plurality of rules by:

determining the optimum allocation value calculated for the surrendering certificate is less than an optimum allocation value calculated for the new certificate; and determining the cost of insurance calculated for the surrendering certificate is greater than a cost of insurance calculated for the new certificate.

36. The computer-readable media of claim 32, wherein the logic is further operable, when executed by the one or more processors, to implement a first rule of the plurality of rules by:

determining the optimum allocation value calculated for the surrendering certificate is greater than an optimum allocation value calculated for the new certificate; and determining an event has occurred.

37. The computer-readable media of claim 36, wherein the event is a timer.

38. The computer-readable media of claim 32, wherein a sum total of the optimum allocation values calculated for the plurality of certificates substantially equals a total value of the financial account.

39. The computer-readable media of claim 32, wherein each certificate of the plurality of certificates is configured to qualify for tax purposes as a life insurance contract without being characterized as a modified endowment contract.

40. The computer-readable media of claim 32, wherein each certificate of the plurality of certificates is configured to qualify for tax purposes as a modified endowment contract.

41. The computer-readable media of claim 32, wherein the logic is further operable, when executed by the one or more processors, to calculate a cost of insurance for each certificate of the plurality of certificates, the allocated respective portion of each certificate having a value greater than or equal to the calculated cost of insurance for the certificate;

wherein the cost of insurance calculated for each certificate of the plurality of certificates is at least partially based one or more factors selected from the group consisting of:

a current age of a respective one of the plurality of persons; a salary of a respective one of the plurality of persons; a health-defining factor of a respective one of the plurality of persons;

and a job grade of a respective one the plurality of persons.

42. The computer-readable media of claim 32, wherein the logic is further operable, when executed by the one or more processors, to calculate a cost of insurance for each certificate of the plurality of certificates, wherein cost of insurance calculated for each certificate of the plurality of certificates is at least partially based on the net amount at risk for the certificate.

43. The computer-readable media of claim 32, wherein the death benefit provided to at least one beneficiary designated by the respective person for each certificate of the plurality certificates is conditional upon a relationship between the respective person and the sponsor.

44. The computer-readable media of claim 43, wherein the condition is employment of the respective person by the sponsor.

45. The computer-readable media of claim 32, wherein the logic is further operable, when executed by the one or more processors, to manage the payment of one or more costs for each certificate of the plurality of certificates by automatically making one or more corresponding withdrawals from the financial account.

46. The computer-readable media of claim 32, wherein the logic is further operable, when executed by the one or more processors, to:

calculate a cost of insurance for each certificate of the plurality of certificates, the allocated respective portion of each certificate having a value greater than or equal to the calculated cost of insurance for the certificate; and calculate an initial payment to be paid by the sponsor as a lump sum in exchange for the plurality of certificates, the calculated initial payment less than or equal to a total sum of the cost of insurance calculated for each certificate of the plurality of certificates.

* * * * *